(12) United States Patent
Howard et al.

(10) Patent No.: US 8,231,996 B2
(45) Date of Patent: Jul. 31, 2012

(54) METHOD OF COOLING A BATTERY PACK USING FLAT HEAT PIPES

(75) Inventors: Keith Howard, Santa Clara, CA (US); Sheau-Pyng Lin, Cupertino, CA (US)

(73) Assignee: Atieva USA, Inc, Redwood City, CA (US)

(*) Notice: Subject to any disclaimer, the term of this patent is extended or adjusted under 35 U.S.C. 154(b) by 754 days.

(21) Appl. No.: 12/372,693

(22) Filed: Feb. 17, 2009

(65) Prior Publication Data

US 2009/0208829 A1 Aug. 20, 2009

Related U.S. Application Data

(60) Provisional application No. 61/029,300, filed on Feb. 15, 2008, provisional application No. 61/029,294, filed on Feb. 15, 2008.

(51) Int. Cl.
*H01M 10/50* (2006.01)
(52) U.S. Cl. .................................................. 429/120
(58) Field of Classification Search .............. 429/120
See application file for complete search history.

(56) References Cited

U.S. PATENT DOCUMENTS

| | | | |
|---|---|---|---|
| 4,633,418 A | 12/1986 | Bishop | |
| 5,214,370 A | 5/1993 | Harm et al. | |
| 5,574,355 A | 11/1996 | Mcshane et al. | |
| 5,756,227 A * | 5/1998 | Suzuki et al. | 429/62 |
| 6,504,342 B2 | 1/2003 | Inui et al. | |
| 6,953,638 B2 | 10/2005 | Inui et al. | |
| 7,128,999 B1 | 10/2006 | Martin et al. | |
| 7,424,926 B2 | 9/2008 | Tsuchiya | |
| 7,433,794 B1 | 10/2008 | Berdichevsky et al. | |
| 2003/0054230 A1 * | 3/2003 | Al-Hallaj et al. | 429/120 |
| 2006/0216582 A1 * | 9/2006 | Lee et al. | 429/120 |
| 2007/0018610 A1 * | 1/2007 | Wegner | 320/112 |

FOREIGN PATENT DOCUMENTS

WO 9831059 A1 7/1998

* cited by examiner

*Primary Examiner* — Eugenia Wang
(74) *Attorney, Agent, or Firm* — Charles Shemwell

(57) ABSTRACT

Methods of cooling a battery pack comprising a large number of cells are disclosed in various embodiments. In one embodiment, one or more low thermal resistance heat pipes are used to transfer heat away from the battery pack. In another embodiment, the heat pipes are coupled to a cold plate cooled by circulating liquid.

6 Claims, 20 Drawing Sheets

Front View

Cross Section

↑ Direction of cell loading

Terminal Contacts On Cathode Plate

Top view of cathode plate

Side view of cathode plate

Cold Plate Interface - Top View
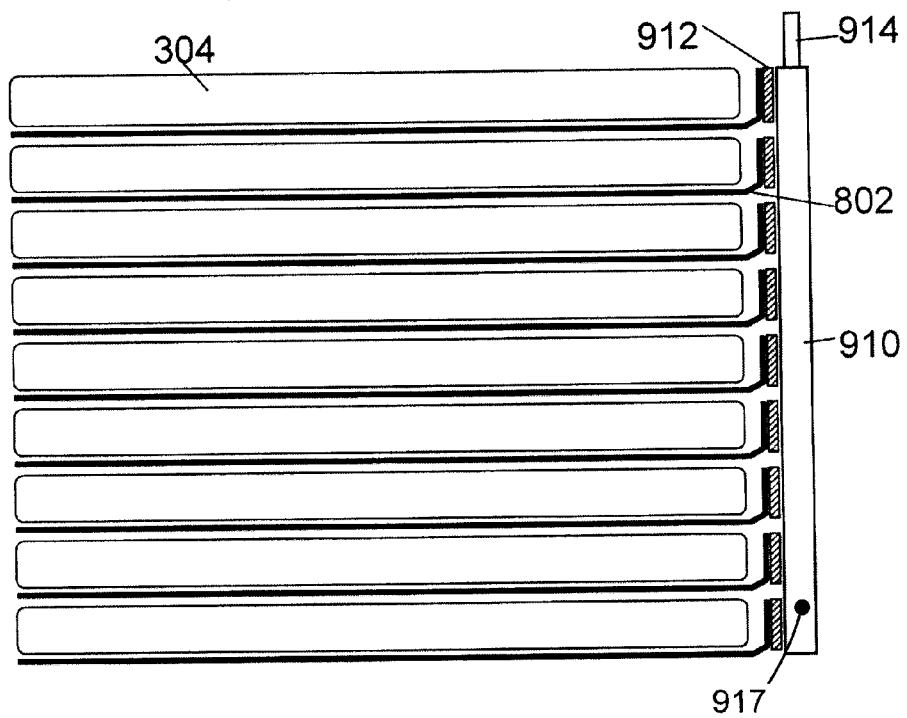
Fig. 10
Cold Plate Interface - Left View
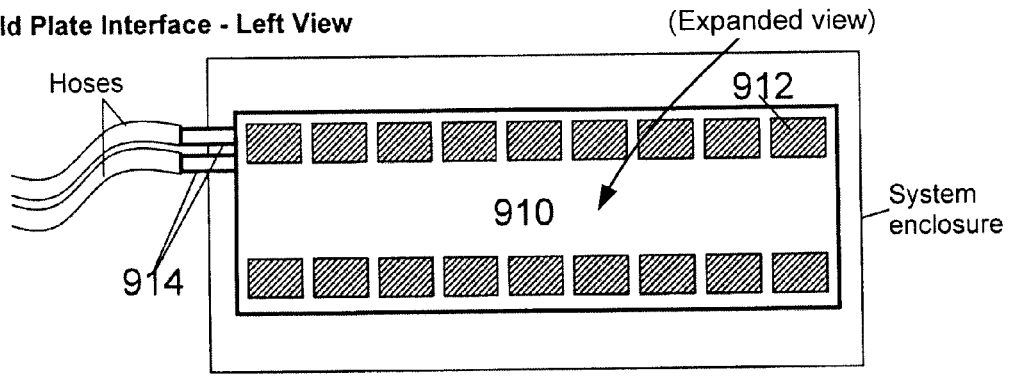

FIG. 12A

| CONFIGURATION - LiFePO4 18650XZ 25°C | | | | | | |
|---|---|---|---|---|---|---|
| CAPACITY AT END OF LIFE | 70% | 70% | 70% | 80% | 80% | 80% |
| DRIVING RANGE PER YEAR(km) | 12,000 | 24,000 | 36,000 | 12,000 | 24,000 | 36,000 |
| capacity (KWh) @25°C, 2C, SOL | 20.1 | 20.1 | 20.1 | 20.1 | 20.1 | 20.1 |
| capacity (KWh) @25°C, 2C, EOL | 14.1 | 14.1 | 14.1 | 16.1 | 16.1 | 16.1 |
| range/charge (km) SOL | 147 | 147 | 147 | 147 | 147 | 147 |
| range/charge (km) EOL | 103 | 103 | 103 | 118 | 118 | 118 |
| total life in MWh | 16.5 | 28.5 | 37.5 | 11.1 | 19.3 | 25.6 |
| total life in km | 120,800 | 208,077 | 274,084 | 81,261 | 140,890 | 186,511 |
| total life in years | 10.1 | 8.7 | 7.6 | 6.8 | 5.9 | 5.2 |
| Cost per km | 0.157 | 0.091 | 0.069 | 0.234 | 0.135 | 0.102 |

FIG. 12B

| PACK REQUIREMENTS | | | | | | |
|---|---|---|---|---|---|---|
| USABLE SPACE (mm) | length(X) | width(Y) | height(Z) | | | |
| | 920 | 692 | 296 | | | |
| PACK DESIGN ASSUMPTIONS | space btw module (mm) | space btw cells (mm) | space for enclosure (mm) | mounting space per block (cells) | | |
| | 10 | 2 | 5 | 2 | | |
| PACK VOLTAGE REQUIREMENT | operating Vmin | operating Vmax | | | | |
| | 250 | 385 | | | | |
| PACK WEIGHT MAX (kg) | 255 | | | | | |
| PACK LIFE MIN (km) | 160,000 | | | | | |
| AVG BAT PWR / SPD (Wh/km) | 137 | | | | | |
| CELL SPEC | | | | | | |
| CELL SIZE (mm) | diameter | height | weight(g) | | | |
| | 18 | 65 | 38 | | | |
| CELL CHARACTERISTIC @25°C, 1C, at beg of life | capacity nom (Ah) | Vnom (v) | Vmax (v) | Vmin(v) | R (ohm) | Discharge Voltage @25°C, 2C |
| | 1.2 | 3.2 | 3.6 | 2.5 | 0.045 | 94% |
| CELL DEGRADATION PER CYCLE @25°C | 0.00005 | 0.00005 | 0.00005 | 0.00005 | 0.00005 | 0.00005 |
| CELL DEGRADATION PER YEAR @25°C | 2.5% | 2.5% | 2.5% | 2.5% | 2.5% | 2.5% |
| CELL DEGRADATION PER KM @25°C | 2.0833E-06 | 1.0417E-06 | 6.9444E-07 | 2.0833E-06 | 1.0417E-06 | 6.9444E-07 |

FIG. 12C

| PACK DESIGN - module in XZ plane | | | | | | | |
|---|---|---|---|---|---|---|---|
| max rows / module | 16 | | | | | | |
| max columns / module | 45 | | | | | | |
| modules / pack | 9 | | | | | | |
| max blocks / pack | 106 | | | | | | |
| max blocks / module | 11 | | | | | | |
| selected modules / pack | 9 | | | | | | |
| selected rows / module | 16 | | | | | | |
| selected blocks / module | 10 | | | | | | |
| selected columns/module | 40 | | | | | | |
| blocks/pack | 90 | | | | | | |
| cells / block | 62 | | | | | | |
| total cells / pack | 5,580 | | | | | | |
| capacity (KWh) @25°C, 2C, SOL | 20.1 | 20.1 | 20.1 | 20.1 | 20.1 | 20.1 | |
| capacity (KWh) @25°C, 2C, EOL | 14.1 | 14.1 | 14.1 | 16.1 | 16.1 | 16.1 | |
| capacity (KWh) @25°C, 2C, avg | 17.1 | 17.1 | 17.1 | 18.1 | 18.1 | 18.1 | |
| total life-long capacity (MWh) | 16.5 | 28.5 | 37.5 | 11.1 | 19.3 | 25.6 | |
| | | | | | | | |
| range/charge (km) SOL | 147 | 147 | 147 | 147 | 147 | 147 | |
| range/charge (km) EOL | 103 | 103 | 103 | 118 | 118 | 118 | |
| range/charge (km) avg | 125 | 125 | 125 | 132 | 132 | 132 | |
| total life in km | 120,800 | 208,077 | 274,084 | 81,261 | 140,890 | 186,511 | |
| total life in years | 10.1 | 8.7 | 7.6 | 6.8 | 5.9 | 5.2 | |
| total life in cycles | 967 | 1,665 | 2,193 | 614 | 1,065 | 1,410 | |
| | | | | | | | |
| heat @100A (W) | 653 | | | | | | |
| cell weight (kg) | 212 | | | | | | |
| space for other parts | | Module dimensions - 2mm border | | | | | |
| length (mm) | 104 | length (mm) | 811 | | | | |
| width (mm) | 12 | width (mm) | 74 | | | | |
| height (mm) | 9 | height (mm) | 282 | | | | |

FIG. 12D

| COST | | | | | | | |
|---|---|---|---|---|---|---|---|
| cell unit cost | $ | 2.00 | | | | | |
| cell total cost | $ | 11,160 | | | | | |
| other cost of pack | $ | 2,900 | | | | | |
| total matl cost | $ | 14,060 | | | | | |
| factory headcount | | 30 | | | | | |
| production rate unit/mon | | 400 | | | | | |
| factory expense/mon | $ | 20,000 | | | | | |
| factory ovhd | $ | 206 | | | | | |
| total cost | $ | 14,266 | | | | | |
| gross margin | | 25% | | | | | |
| Price | $ | *19,022* | $ | 19,022 $ | 19,022 $ | 19,022 $ | 19,022 $ | 19,022 |
| Cost per km | $ | *0.157* | $ | 0.091 $ | 0.069 $ | 0.234 $ | 0.135 $ | 0.102 |

FIG. 13A

| Thermal Calculation of Temperature Gradient From Cell Case To Cold Plate | | |
|---|---|---|
| System Configuration | | |
| modules/pack | 9 | |
| heatpipes/module | 2 | |
| cells/block | 62 | |
| blocks/heatpipe | 5 | |
| columns/block | 8 | |
| cell-cell(cm) | 2 | |
| cell radius(mm) | 9 | |
| module thickness(cm) | 7.5 | |
| current/cell avg(Amp) | 1.6 | |
| cell internal resistance (ohm) | 0.035 | |
| | | |
| Characteristic of heatpipe | | |
| Revap(degC/W/cm^2) | 0.20 | ; thermal resistance at the evaporator & condenser of the heatpipe |
| Raxial (degC/W/cm^2) | 0.02 | ; axial thermal resistance of the heat pipe |
| width of heatpipe(cm) | 5.00 | |
| thickness of heatpipe(cm) | 0.20 | |

FIG. 13B

| Calculation | | |
|---|---|---|
| heat source - cells | | |
| heat/cell avg(W) | 0.09 | ; = cell internal resistance * (current/cell avg) ^2 |
| heat/cell max(W) | 0.18 | ; = heat/cell avg * 2 |
| | | |
| Cell case -> TIM1 | | |
| cell area(m^2) | 0.0002543 | ; = 3.14 * cell radius ^2 |
| TIM1 thickness(mm) | 0.5 | |
| TIM1 thermal conductivity(W/mK) | 3 | |
| temp gradient of TIM1 (degC) | 0.12 | ; = (heat/cell max) / cell area * (TIM1 thickness / TIM1 thermal conductivity) |
| | | |
| Anode Plate | | |
| Anode plate thickness(mm) | 1 | |
| Aluminum thermal conductivity(W/mK) | 180 | |
| temp gradient of anode plate (degC) | 0.004 | |
| | | |
| TIM2 | | |
| Qevap(W/cm^2) | 0.14 | |
| TIM2 thickness(mm) | 0.5 | |
| TIM2 thermal conductivity(W/mK) | 3 | |
| temp gradient of TIM2 (degC) | 0.23 | |
| | | |
| Heat pipe evaporator -> cold plate | | |
| heat transport per heatpipe | | |
| heat/heatpipe (W) | 55.55 | ; = heat/cell max * cells/block * blocks/heatpipe |
| evaporator heat flux, Qevap | | |
| length at evaporator(cm) | 80.00 | ; = cell-cll * blocks/heatpipe * columns/block |
| heat input area(cm^2) | 400.00 | ; = length at evaporator * width of tube |
| Qevap(W/cm^2) | 0.14 | ; = (heat/heatpipe) / heat input area |
| temp gradient at evap(degC) | 0.03 | ; = Qevap * Revap |
| condenser heat flux, Qcond | | |
| length at condenser(cm) | 7.00 | ; = module thickness - 0.5 |
| heat output area(cm^2) | 35.00 | ; = length at condenser * width of heatpipe |
| Qcond(W/cm^2) | 1.59 | ; = (heat/heatpipe) / heat output area |
| temp gradient at cond(degC) | 0.32 | ; = Qcond * Revap |
| axial heat flux, Qaxial | | |
| heatpipe cross section area(cm^2) | 0.85 | ; = vapor space * width of tube |
| Qaxial(W/cm^2) | 65.36 | ; = (heat/heatpipe) / tube cross section area |
| temp gradient axial(degC) | 1.31 | ; = Qcond * Revap |
| temp gradient of heatpipe (degC) | 1.65 | ; = temp gradient at evap + temp gradient at cond + temp gradient axial |

FIG. 13C

| Calculation (cont.) | | |
|---|---|---|
| TIM3 | | |
| Qcond(W/cm^2) | 1.59 | |
| TIM3 thickness(mm) | 0.5 | |
| TIM3 thermal conductivity(W/mK) | 3 | |
| temp gradient of TIM3 (degC) | 2.65 | |
| temp gradient from case to cold plate (degC) | 4.65 | sum of temp gradients of TIM1, anode plate, TIM2, heat pipe, TIM3 |
| max heat to cold plate(W) | 999.94 | = modules/pack * heatpipes/module * heat/heatpipe |

METHOD OF COOLING A BATTERY PACK USING FLAT HEAT PIPES

CROSS-REFERENCE TO RELATED APPLICATIONS

This application claims priority to, and hereby incorporates by reference, U.S. Provisional Applications No. 61/029,300, and No. 61/029,294, filed on Feb. 15, 2008.

FIELD OF THE INVENTION

The present invention relates generally to battery systems, and more particularly to cooling systems for battery packs.

BACKGROUND

High-density, small form-factor battery cells have recently been proposed for use in high cell-count automotive and industrial battery packs. The small form-factor cells have a larger surface-area-to-volume ratio than larger cells, and thus provide the potential for better cooling efficiency. Also, because each small form-factor cell constitutes a smaller portion of the overall energy capacity of the pack, single cell failure is more tolerable than in the case of large-cell battery packs.

Like most battery cells, small form-factor battery cells tend to degrade when subject to elevated temperatures. For example, lithium-ion batteries lose 20% of their usable charge within three months when subjected to 60° C. temperature. In contrast, they will lose the same percentage of charge in three years when the temperature is held at 25° C. Therefore, it is important to keep the battery cells cool and maintain a constant temperature across the cells, a substantial challenge in a high cell-count battery pack which can generate tremendous amounts of heat under load. As an example, conventional circulating-liquid manifolds typically have many inlet and outlet connections and thus are susceptible to liquid leakage which may short electrical connections and/or damage system components.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 illustrates one embodiment of a system for cooling a battery pack using one or more heat pipes coupled a cold plate;

FIGS. 12A-12D show a representative set of design parameters for a battery pack intended to be used in an electric vehicle; and FIGS. 13A-13C show a thermal calculation in one embodiment.

DETAILED DESCRIPTION

Methods of cooling a battery pack using one or more heat pipes are disclosed in various embodiments.

A Battery Pack Using a Large Number of Small Cells

Figure 1:
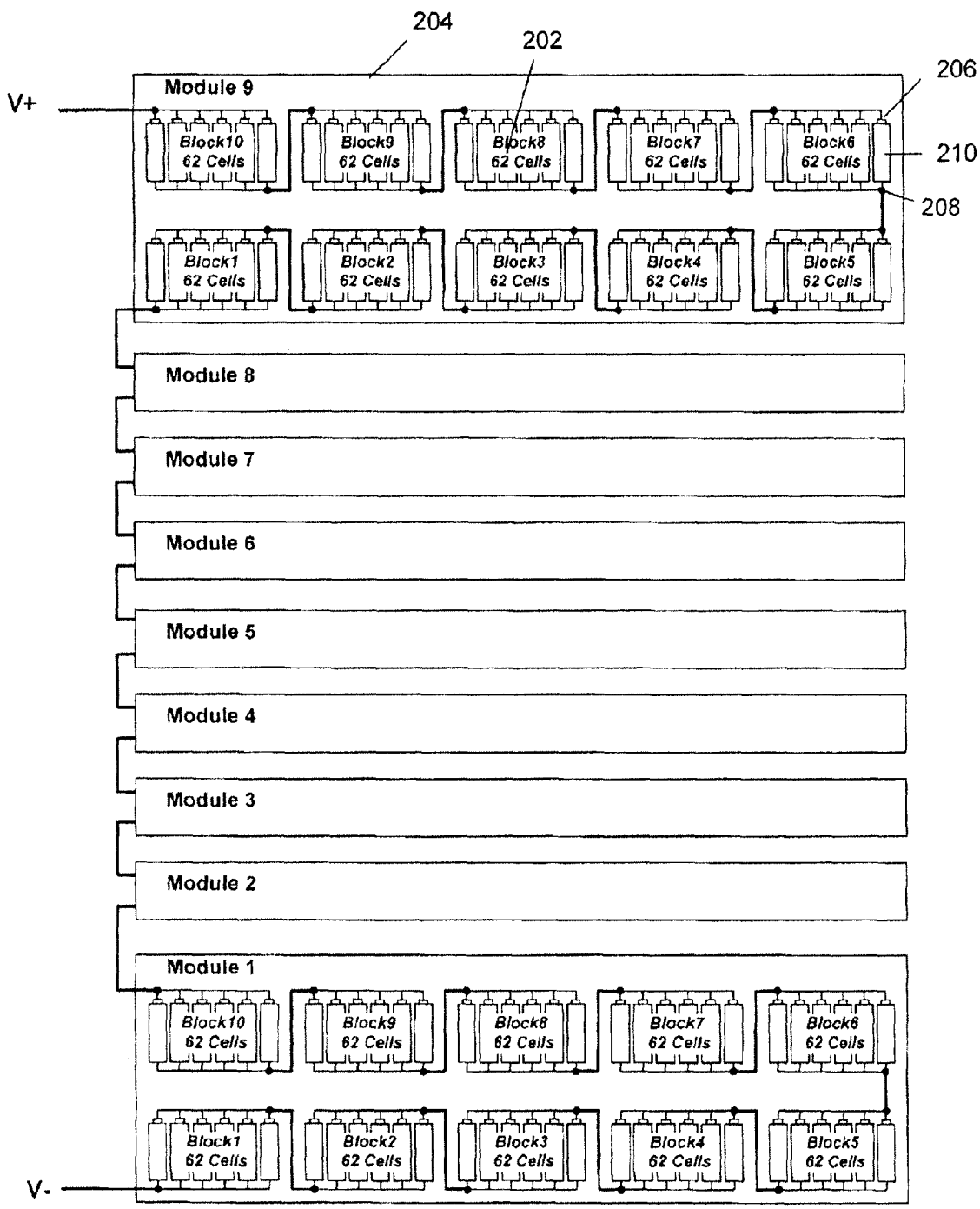
FIG. 1 illustrates one embodiment of a battery pack using a large number of small battery cells.

FIG. 1 shows one embodiment of a battery pack using a large number of small battery cells. In this embodiment, cells 210 are grouped into a number of blocks 202; blocks are in turn grouped into modules 204. In the example shown in FIG. 1, each pack comprises nine (9) modules; each module comprises ten (10) blocks; and each block comprises sixty two (62) cells. Therefore, there are a total number of five thousand five hundred and eighty (5580) cells in a pack. Each cell 210 has a positive and a negative terminal, called a cathode 206 and an anode 208, respectively. In this embodiment, the cells in each block are electrically connected in parallel, i.e., the cathodes are connected together, and the anodes are connected together. The blocks in each module are connected in series, i.e., the cathode of the first block is connected to the anode of the second block, the cathode of the second block is connected to the anode of the third block, and so on and so forth. In addition, the modules are also connected in series. The total voltage potential of a pack is the voltage at the cathode of the last block of the last module (module number 9, block number 10 in the example shown in FIG. 1, marked as 'V+') relative to the anode of the first block of the first module (marked as 'V−' in FIG. 1). Therefore, the total voltage of a pack is equal to the voltage potential of each block times the number of blocks in each pack.

FIGS. 12A-12D show a representative set of design parameters for a battery pack intended to be used in an electric vehicle using standard 18650-type lithium-ion battery cells. FIG. 12A of the spreadsheet summarizes the required electrical capacity and estimated total life of a battery pack. FIG. 12B, labeled 'pack requirements', shows dimensional and electrical characteristics of the battery pack. FIG. 12C, labeled 'pack design' shows the number of cells, modules, and blocks in a pack, derived according to the information from FIG. 12B of the spreadsheet. FIG. 12D shows the calculation of an estimated cost of a battery pack.

Figure 2:
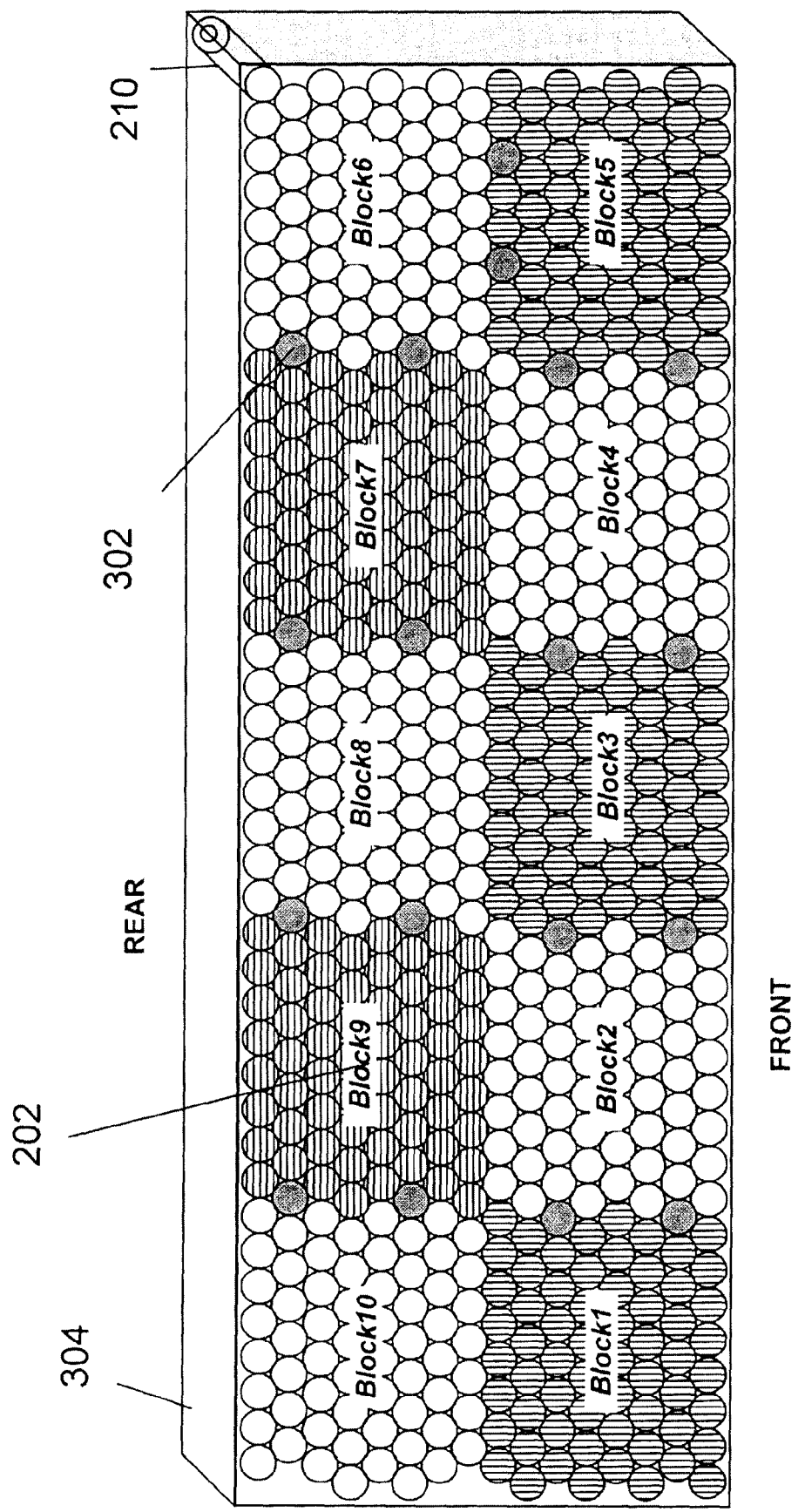
FIG. 2 illustrates one embodiment of the physical layout of battery cells in a module.

FIG. 2 shows one embodiment of a physical layout of the battery cells in each module 304. In this example, cells 210 have a cylindrical shape with a circular cross section. Cells are arranged in a compact honeycomb array as shown in FIG. 2. In alternative embodiments, the cylindrical cells may have other types of cross section, such as triangular, square, rectangular, or hexagonal shape, and the cells may be arranged in other types of array, such as a square or rectangular array, or in an irregular array.

For each block 202, there are two cylindrical bus bars 302, shown as dark gray circles in FIG. 2. The bus bars are made of a conducting material, such as aluminum. The bus bars electrically connect the cathode of one block to the anode of the next block, providing a low resistance path for the current to flow between adjacent blocks. The bus bars also provide mechanical support for holding the module together and for preventing pressure on the module enclosure from being transferred to the cells.

Figure 3:
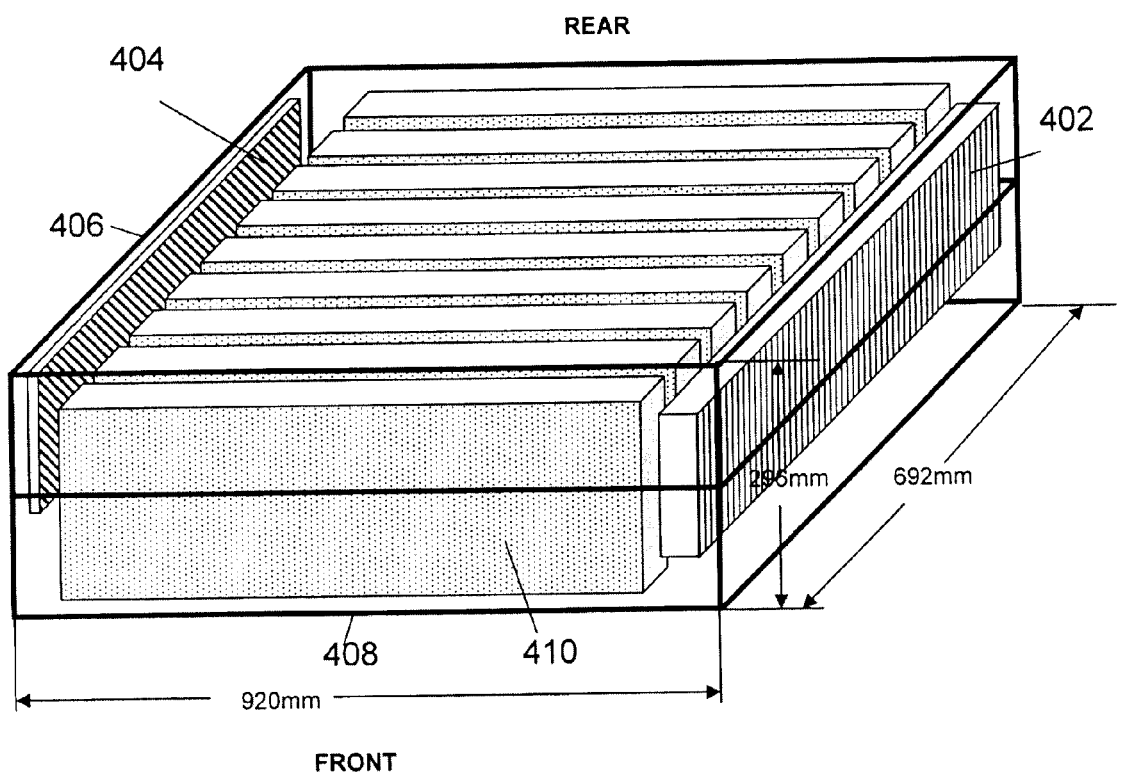
FIG. 3 illustrates one embodiment of the layout of a pack comprising a plurality of modules.

FIG. 3 shows one embodiment of a pack layout. In this example, the pack 408 includes nine modules 410. In one embodiment, each module is oriented in a vertical plane, for example, with the front of module 410 corresponding to the front of module 304 of FIG. 2. A unified cooling system 402 provides even cooling for each cell. A battery management system 404 provides fault-tolerant, self-learning, and self-repairing controls of battery operation. The pack 408, including the cooling system 402 and battery management system 404, is enclosed in an enclosure 406

Figure 4A:
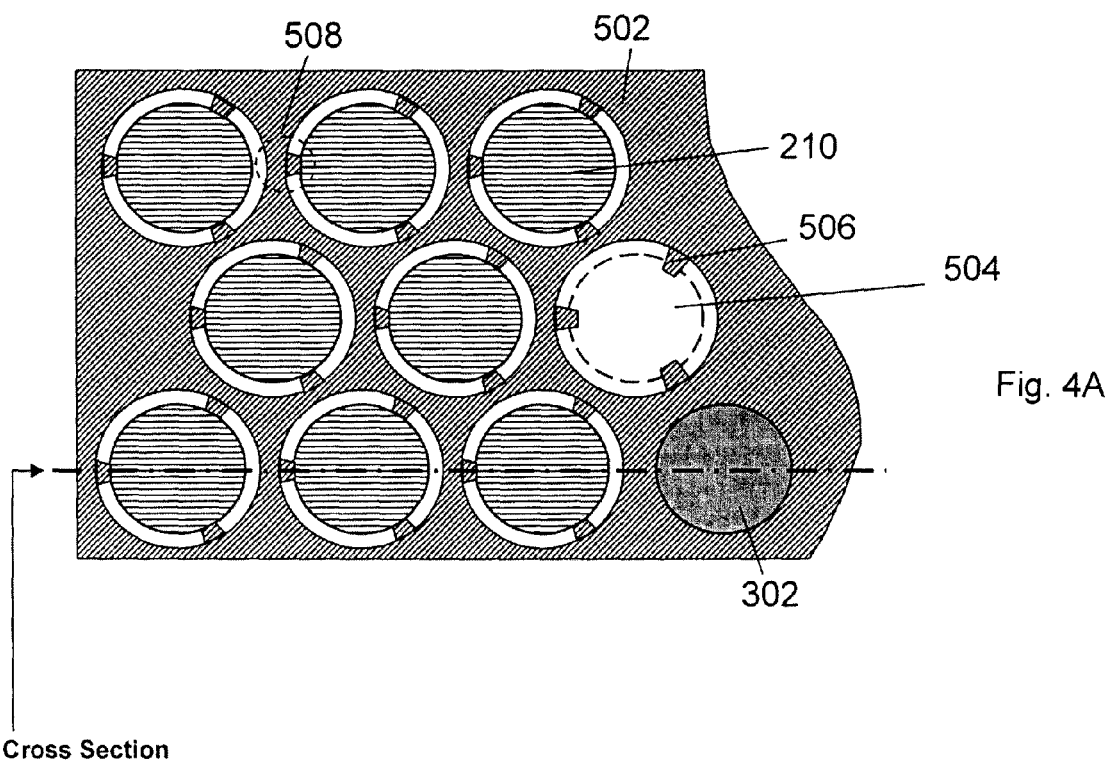
FIGS. 4A and 4B illustrate one embodiment of a frame that holds a plurality of cells in a module.
Figure 4B:
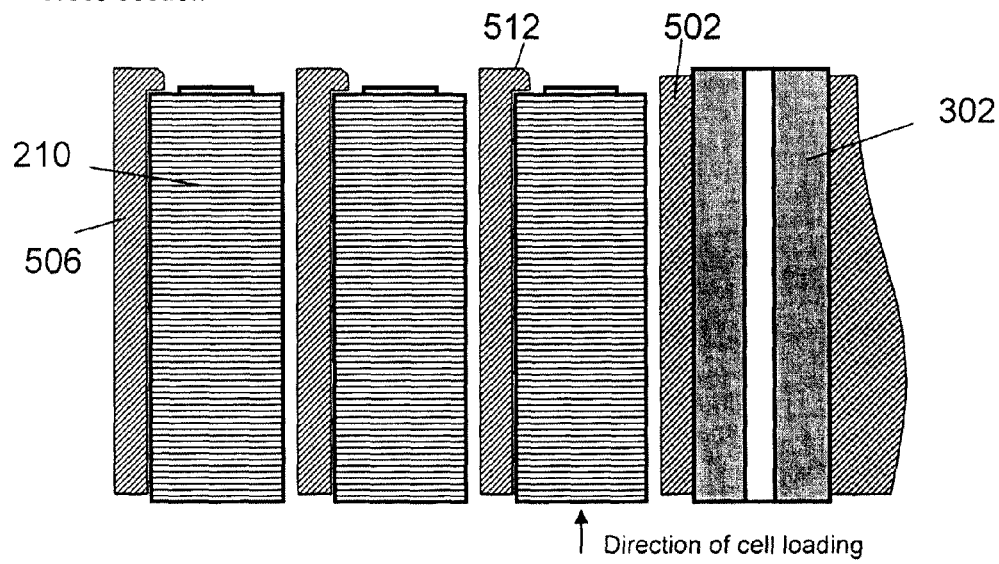

In one embodiment, the cells in each module are held together by a frame 502 made of an insulating material, such as plastic. The material of the frame is chosen for mechanical strength, and for its thermal properties such as its tolerable temperature range and thermal conductivity. The frame has a plurality of cylindrical holes 504 into which battery cells 210 may be inserted as shown in FIGS. 4A and 4B. In this example, each hole 504 has a circular cross section with a diameter slightly larger than that of cell's cross section. In one embodiment, three deformable plastic beams 506 each having a cell-stop or lip 512 are attached to or formed integrally with the inner wall of each hole and extend along the length of the hole. As a cell 210 is pressed into the hole (i.e., until a leading surface of the cell contacts the cell-stop 512 as shown), the beams 506 are compressed slightly so that they exert a gentle pressure on the side of the cell to hold the cell securely in place. More generally, any manner of securing a battery cell within the hole may be used, including friction-contact with the cell wall or projections thereof. The plurality of holes 504 is arranged in a desired pattern, which is a compact honeycomb pattern in this example. As shown in FIG. 4A, each deformable beam 506 is disposed in a position 508 where the plastic wall surrounding the hole is the thinnest. The thinness of the plastic wall provides some flexibility when the cell is pressed into the hole. The bus bars 302 are also held in place by the same frame. The cells are oriented so that cathodes all face the front side and anodes all face the rear side.

Figure 5A:
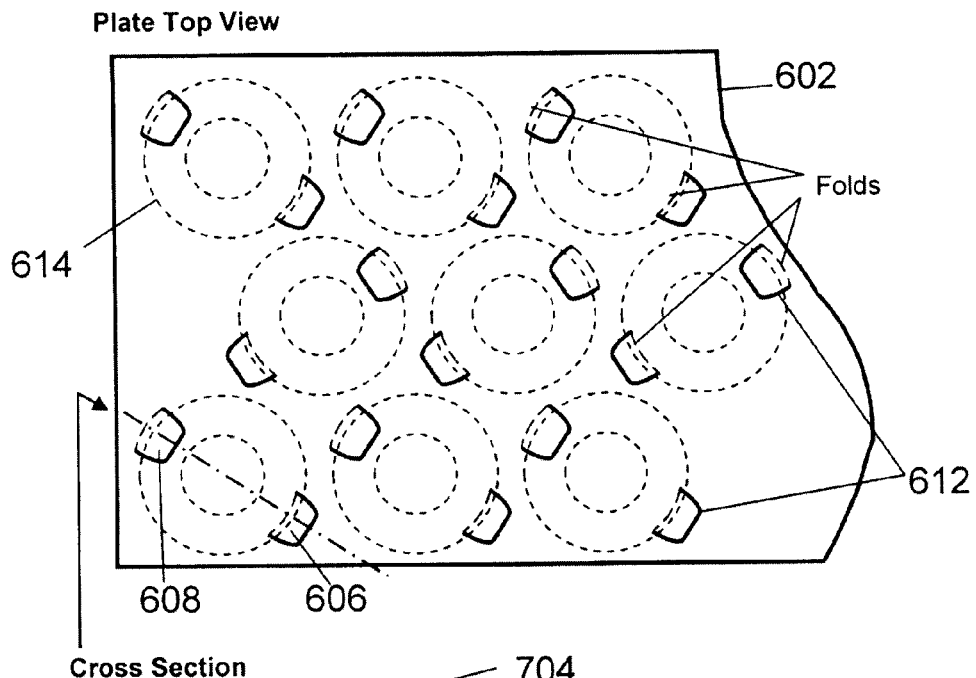
FIGS. 5A and 5B illustrate one embodiment of an anode plate electrically connecting the anode terminals of a plurality of cells.
Figure 5B:
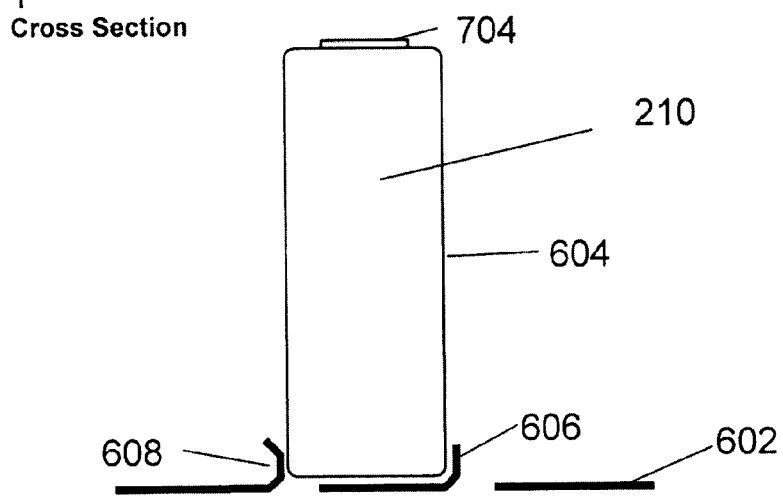

To connect the anodes of the cells in each block together, a conducting plate called an anode plate is used. FIGS. 5A and 5B show one embodiment of the anode plate 602. In this example, the anode plate is made of aluminum and has a thickness of about 1 mm. The anode ends 604 of the cells are held in mechanical and electrical contact with the anode plate 602 by a plurality of pairs of tabs 606 and 608 protruding from one side of the anode plate. In one embodiment, the two tabs 606 and 608 in each pair are disposed on opposite sides of a circumference 614, representing the cross section of a battery cell, shown as one of the dashed circles in FIG. 5A. Each tab is formed, for example, by cutting a slot 612 on the conducting plate along a partial circumference of a geometrical shape (e.g., a semi-circular shape), shown as solid lines in FIG. 5A. The slots 612 can be cut by using a laser, punch, stamp or other cutting means. The area of the plate that is partially separated from the rest of the plate as the result of the cut is then folded to form a spring. In this example, the first tab 606, referred herein as the stop tab, is folded perpendicular to the plate, and the second tab 608, referred herein as the press tab, is folded backward (e.g., approximately 180 degrees, although different bend angles may be used), as shown in FIG. 5B. As the anode end of a cell 604 is disposed between the two tabs, the press tab 608 exerts a spring force on the side of the cell, pushing the cell against the stop tab 606, thus hold the cell firmly in place, securing the anode plate 602 to the cell 210. In this example, the electrical connection between a cell's anode terminal 604 and the anode plate 602 is made through the physical contacts between the tabs and the side of the cell, as well as between the flat surface of the anode plate and the bottom of the cell. (Note that, in this example, the entire case of a cell, including the side and bottom, is the anode terminal.) In alternative embodiments, a set of more than two tabs can be used to secure the anode end of each cell to the anode plate. The tabs may also be folded to form springs with different shapes. The tabs may also be made separately and be attached to the anode plate.

Referring to FIG. 5A, the plurality of circumferences 614, shown in dashed outlines and around which respective sets of tabs are disposed, is arranged in a pattern that is aligned with the hole pattern in the frame 502 which holds the cells, so that the anode plate 602 can be readily snapped onto the anode ends of the cells being held in the frame.

Figure 6A:
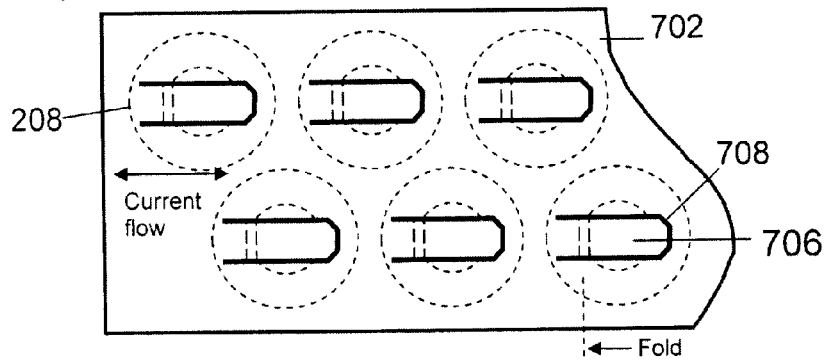
FIGS. 6A and 6B illustrate one embodiment of a cathode plate electrically connecting the cathode terminals of a plurality of cells.
Figure 6B:
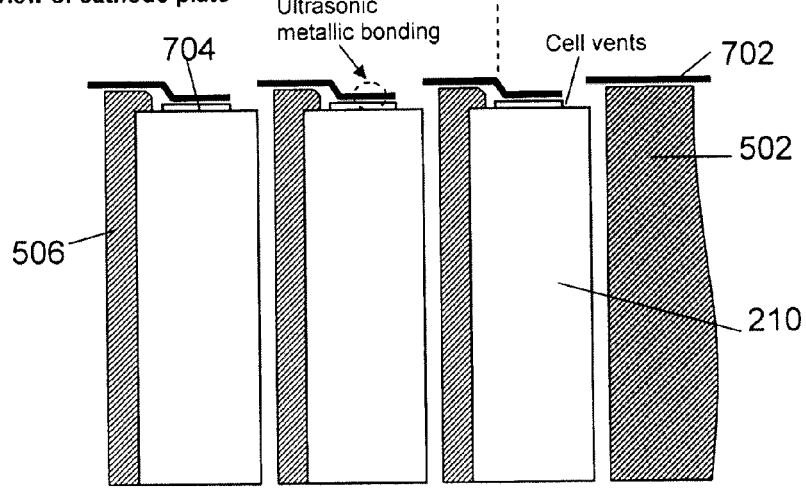
Figure 6C:
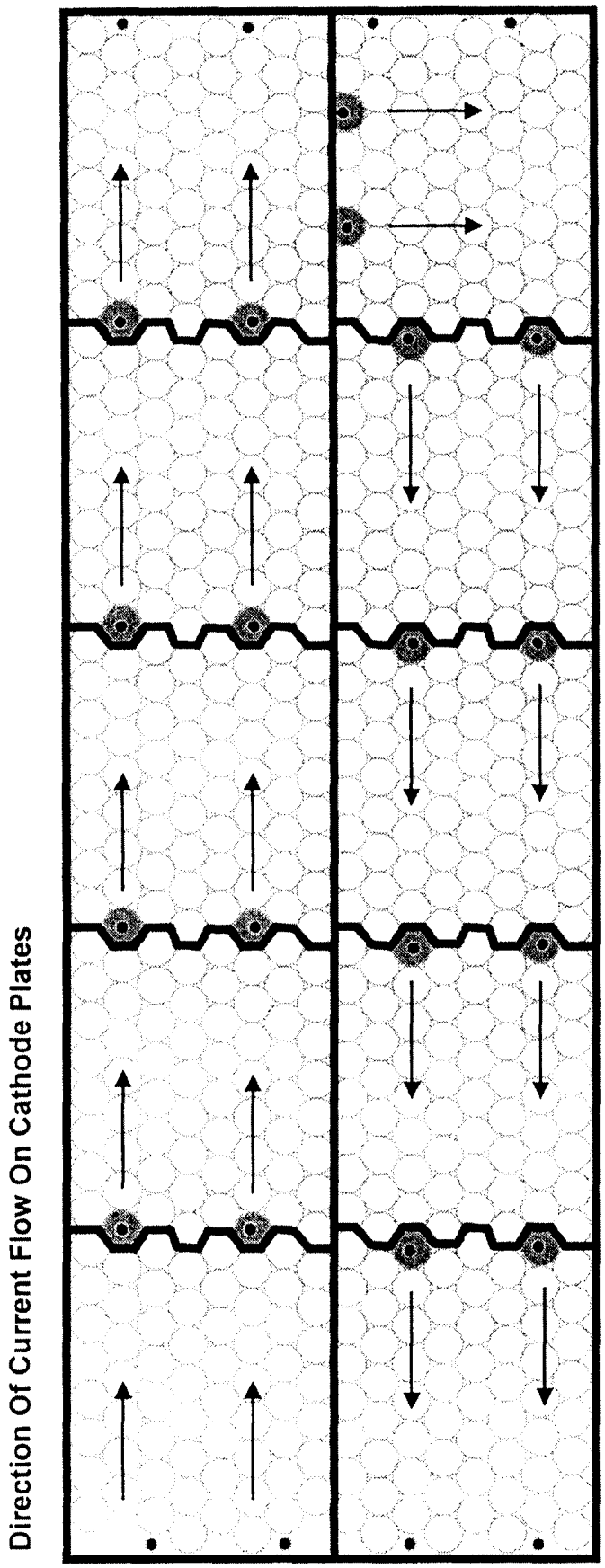
FIG. 6C illustrates the direction of current flow on cathode plates in a module.

FIGS. 6A and 6B illustrates one embodiment of a cathode plate 702 that electrically connects cathode terminals 704 of a plurality of cells. In this example, the cathode plate is made of aluminum and is very thin. A plurality of oblong tabs 706 are formed by cutting a plurality of slots 708 into the cathode plate 702 using a laser, punch, stamp or other cutting means, as shown in FIG. 6A. The tabs 706 are arranged in a pattern that is aligned with the pattern of the holes 504 in the frame 502 which holds the cells. As the cathode plate 702 is placed on top of the cathode ends of the cells held in the frame, the tabs 706 are bended slightly downward to make contacts with cells' cathode terminals 704, as shown in FIG. 6B. The tabs 706 are then welded to the cells' cathode terminals using ultrasonic metallic bonding or other welding means. FIG. 6C shows the direction of current flow on cathode plates.

Figure 7A:
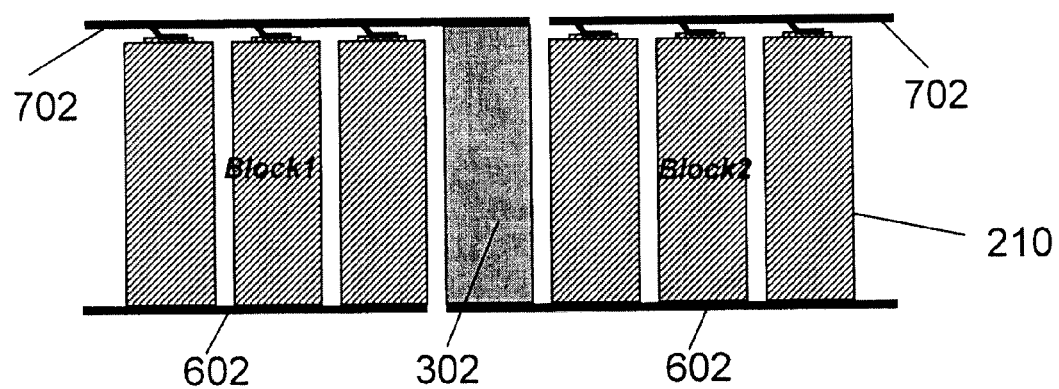
FIG. 7A illustrates one embodiment of the electrical connection between adjacent blocks.
Figure 7B:
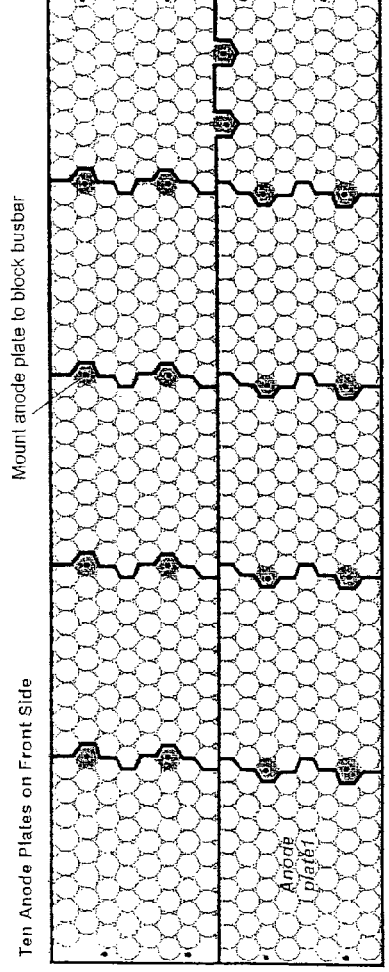
FIGS. 7B and 7C illustrates the layouts of anode plates and cathode plates on the front and rear side of each module, respectively.
Figure 7C:
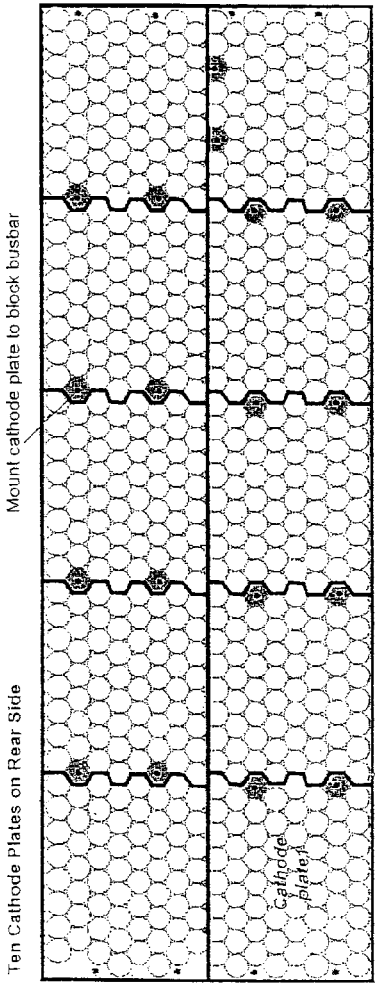

FIG. 7A shows one embodiment of the electrical connection between adjacent blocks. The cathode plate 702 of one block is electrically connected to the anode plate 602 of the next block via a conducting bus bar 302 that is held in the same frame 502 that holds the cells 210, as described above. FIGS. 7B and 7C illustrates the layouts of anode plates and cathode plates on the front and rear side of each module, respectively.

Cooling a Battery Pack Using Heat Pipes

Figure 8:
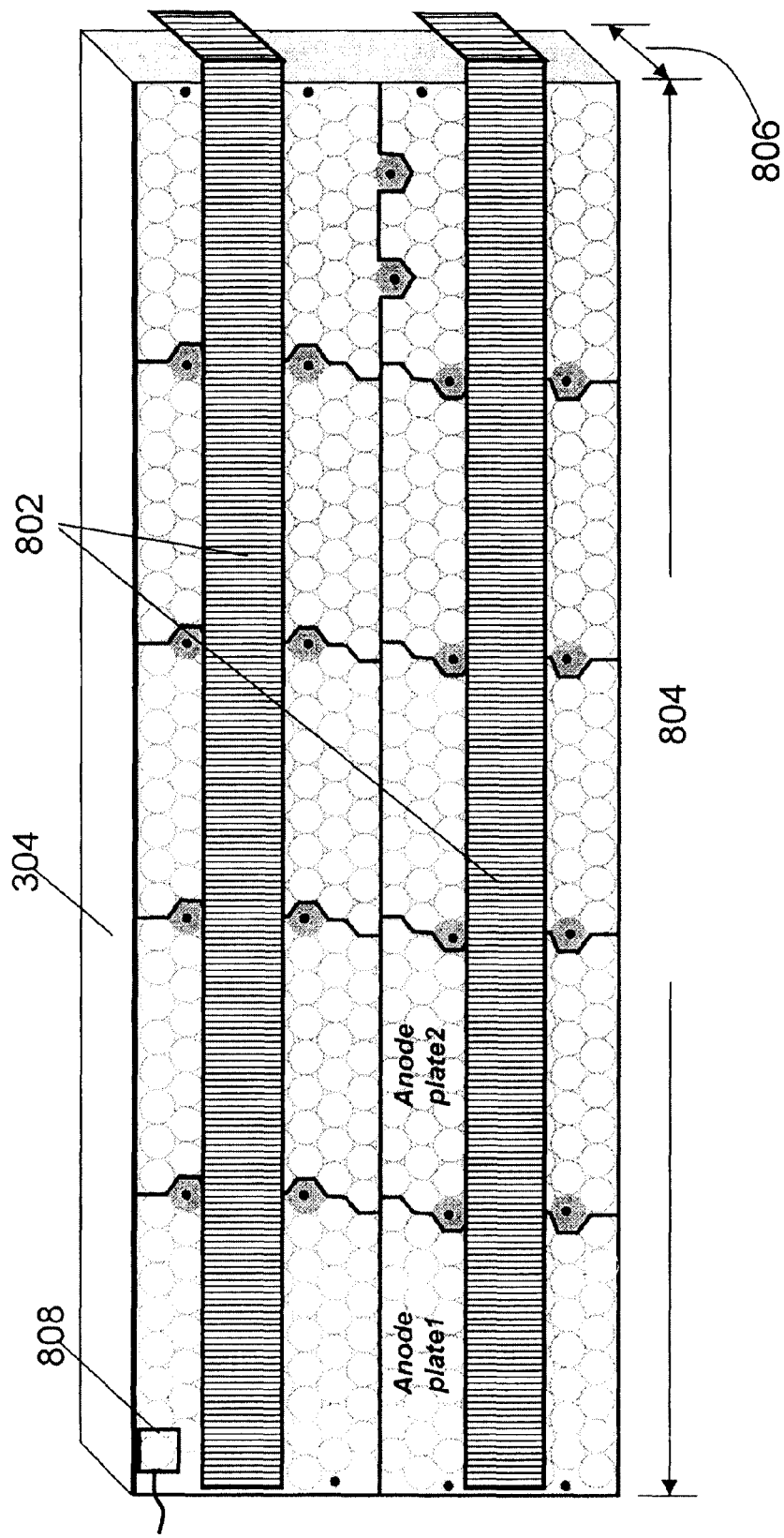
FIG. 8 illustrates one embodiment of a system for cooling a module using one or more heat pipes.

FIG. 8 illustrates one embodiment of a system for cooling a module using one or more heat pipes. A heat pipe is a heat transfer mechanism that can transport large quantities of heat with a small difference in temperature between the hotter and colder surfaces. A typical heat pipe consists of a sealed pipe made of a material with high thermal conductivity such as copper or aluminum. A vacuum pump is used to remove air from the interior of the heat pipe. The pipe is then partially filled with a working fluid, such as water, ethanol, acetone, or mercury. Because the pressure of the vacuum is near or below the vapor pressure of the fluid, some of the fluid will be in liquid phase and some will be in gas phase. Heat pipes employ evaporative cooling to transfer thermal energy from a hotter point to a colder point by the evaporation and condensation of the working fluid.

Figure 9:
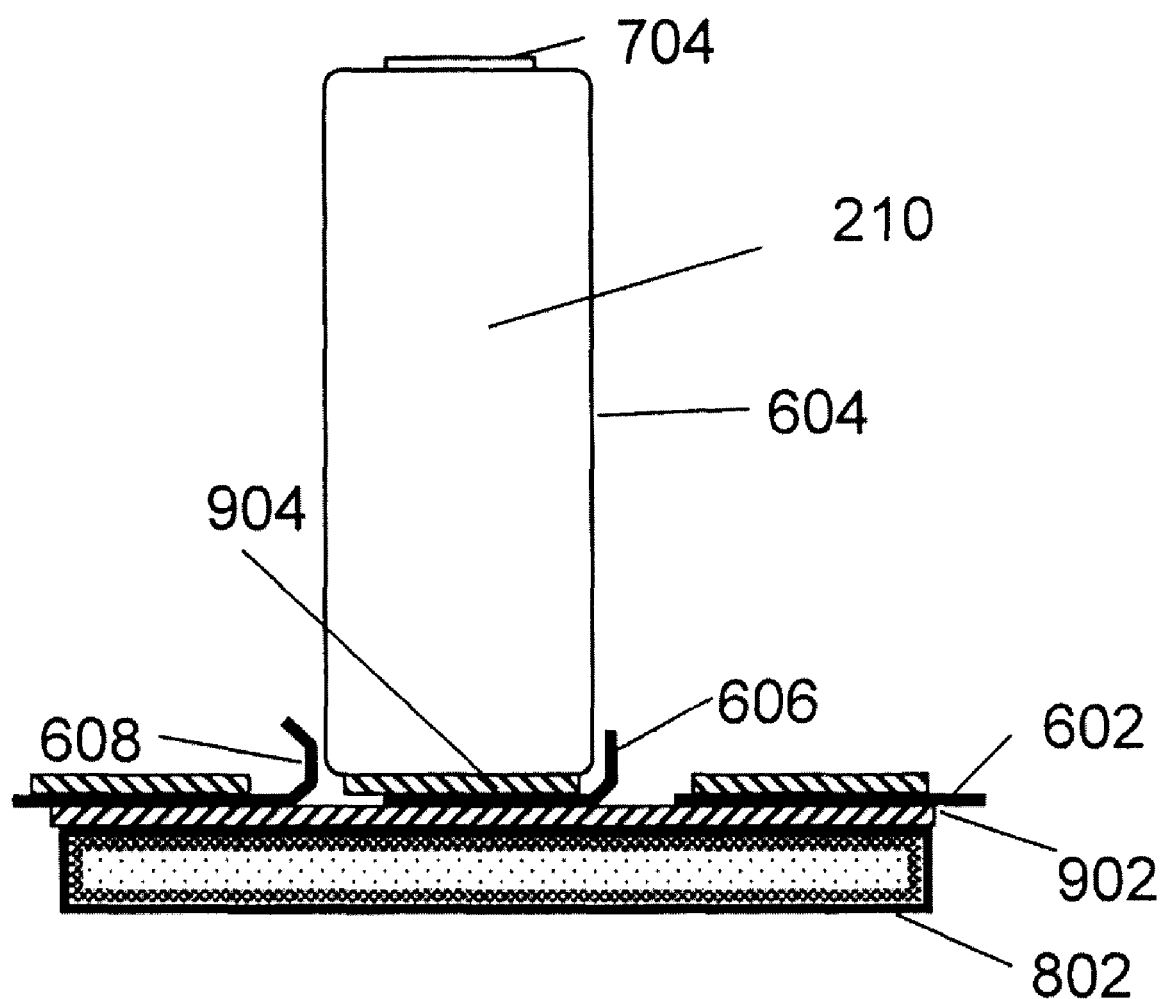
FIG. 9 illustrates one embodiment of a method to establish good thermal contacts between a heat pipe and an anode plate, and between an anode plate and a battery cell.

In the example shown in FIG. 8, two heat pipes 802 are used to cool a module 304 comprising ten blocks. A temperature sensor 808 which is coupled to a battery management system is attached to the hottest cell. Each heat pipe has a rectangular cross section with its width significantly greater than its height, as shown in FIG. 9. The dimensions of each heat pipe are chosen considering factors such as the maximum allowable temperature and heat flux along the path. Each heat pipe has an evaporation section 804 and a condensation section 806 as shown in FIG. 8. A wide flat surface of the heat pipe in the evaporation section is in thermal contact with the anode plates (not shown in FIG. 8) that connect the anode ends of the cells in each block as described above. The anode plates provide some thermal spreading to keep the cells in each block at the same temperature.

While the example described above uses heat pipes with a rectangular cross section, it is understood that heat pipes with other cross sectional shapes can also be used, though preferably with at least one flat surface that enables a good thermal contact with the battery pack.

In one embodiment, a first thermal interface material 902 is sandwiched between each heat pipe 802 and each anode plate 602 to achieve a good thermal contact between the heat pipe and anode plate, as shown in FIG. 9. Examples of thermal interface materials include, but are not limited to, thermal grease, thermal gel, thermal tape, graphite sheet, and conformable gap filler. The choice of material depends on factors such as thermal conductivity, electrical conductivity, thickness, and cost. Also in this example, a second thermal interface material 904 is sandwiched between the anode end 904 of each cell 210 and each anode plate 602 to achieve a good thermal contact between the cell and anode plate, as shown in FIG. 9. In this example, the first interface material is electrically insulating; the second thermal interface material is electrically conducting.

Cooling a Battery Pack Using Heat Pipes Coupled a Cold Plate

FIG. 10 illustrates one embodiment of a system for cooling a battery pack using a plurality of flat heat pipes 802 coupled to a cold plate 910. In this example, nine modules 304 in a battery pack are each coupled one or more flat heat pipes 802 in the fashion described above. The condensation section 806 of each heat pipe is coupled to a cold plate 910 which is cooled by a circulating liquid, such as water, pumped by external power (expanded view 917). In one embodiment, a third thermal interface material 912 is sandwiched between each heat pipe 802 and the cold plate 910 to achieve a good thermal contact. The cold plate could be a swaged-tube type cold plate which has a core thermal resistivity around 1.6° C./(W/cm2). Cold plates with vacuum-brazed inner fins offer better performance with a thermal resistivity less than 0.4° C./(W/cm2), but are more expensive.

Figure 11:
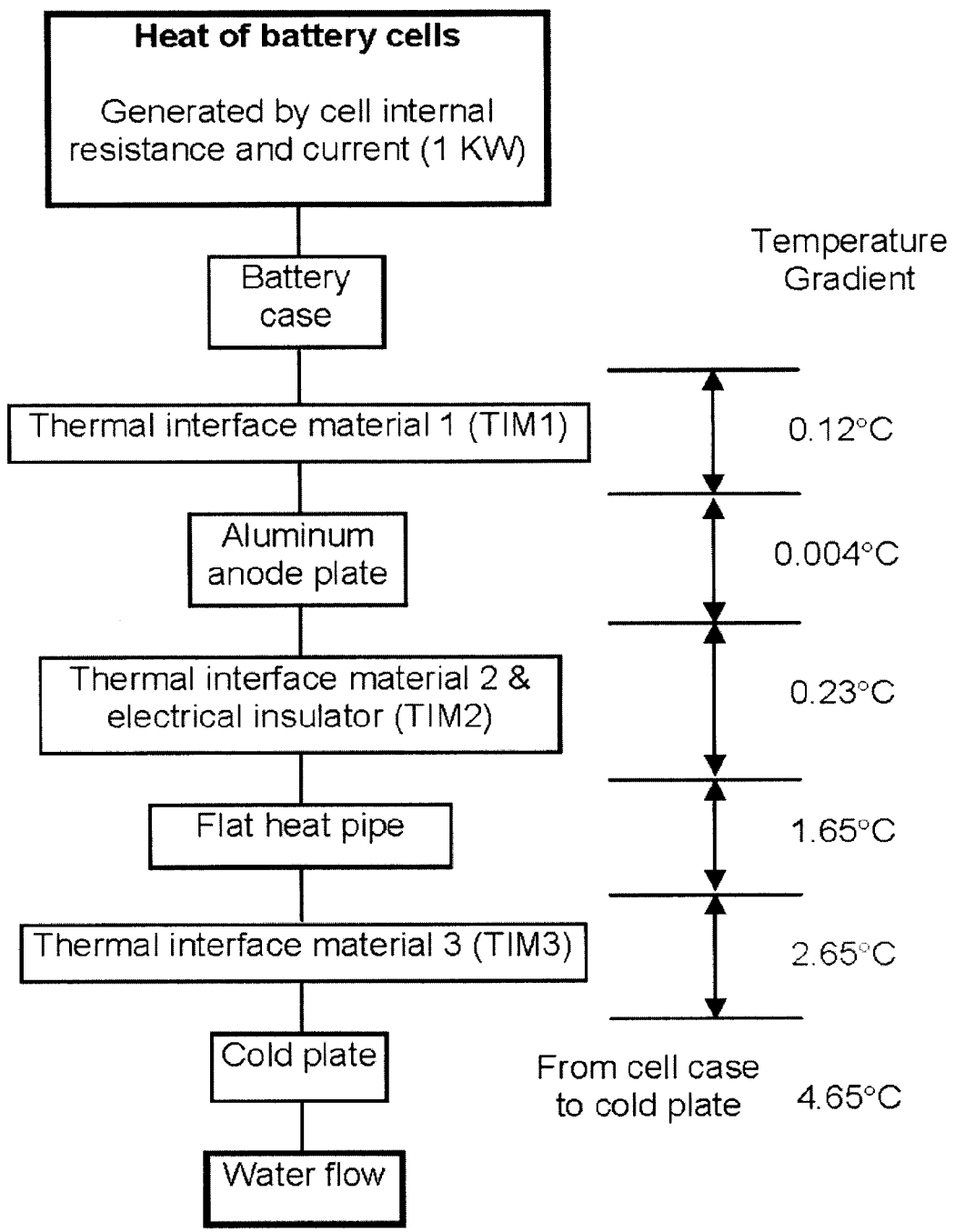
FIG. 11 illustrates a heat transfer path from battery cells to water flow in one embodiment, and the estimated temperature gradient along the path.

The overall cooling performance is determined by the thermal conductance of each component on the path. FIG. 11 shows a heat transfer path from battery cells to water flow in one embodiment, and the estimated temperature gradient along the path. FIGS. 13A-13C show a thermal calculation in one embodiment.

The cooling systems described above have at least two advantages compared to traditional cooling methods that use manifolds with a circulating liquid. First, heat pipes transfer away the heat generated inside battery cells efficiently while maintaining a constant temperature across the cells. Second, only sealed enclosures of heat pipes are in direct contact with cell enclosure. The likelihood of a liquid leakage in the vicinity of cells is very small. For the system in which heat pipes are coupled to a cold plate, there is only one pair of inlet and outlet connections 914 for the circulating liquid, and the connections are located away from the cell enclosure. Therefore, liquid is less likely to come into contact with battery cells in the event of a leakage.

While the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A battery pack comprising:
a plurality of battery cells each having a cylindrical housing with an anode at one end of the housing;
a conducting plate disposed to make electrical contact with the plurality of battery cells;
a first thermal interface material disposed between an anode end of each of the battery cells and the conducting plate to achieve thermal contact between the conducting plate and the plurality of battery cells such that the conducting plate provides thermal spreading to reduce temperature differences between individual battery cells of the plurality of battery cells;
a sealed heat pipe containing a fluid that exists partially in a liquid phase and partially in a gaseous phase, the heat pipe having an evaporation section from which the liquid phase fluid evaporates and a condensation section from which the gaseous phase fluid condenses, the heat pipe further having (i) first and second flat surfaces disposed in thermal contact with first and second subsets of the battery cells, respectively, and (ii) a third flat surface adjacent the evaporation section; and
a second thermal interface material disposed between the conducting plate and the third flat surface of the heat pipe to achieve thermal contact between the evaporation section of the heat pipe and the conducting plate.

2. The battery pack of claim 1 wherein the first thermal interface material is electrically conducting.

3. The battery pack of claim 2 wherein the second thermal interface material is electrically insulating.

4. The battery pack of claim 1 further comprising a cold plate in thermal contact with the condensation section of the heat pipe, wherein the cold plate is cooled by liquid circulation.

5. The apparatus of claim 4 wherein a third thermal interface material is disposed between the condensation section of the heat pipe and the cold plate.

6. The battery pack of claim 1 wherein each of the battery cells has a side wall substantially orthogonal to its anode end, and wherein the first flat surface of the heat pipe is disposed substantially parallel to respective side walls of battery cells of the first subset of the battery cells.

* * * * *